United States Patent
Goepp et al.

(10) Patent No.: US 9,591,040 B2
(45) Date of Patent: Mar. 7, 2017

(54) DYNAMIC SESSION MONITORING IN SECURE MEDIA-BASED CONFERENCING

(71) Applicant: Edifire LLC, Boston, MA (US)

(72) Inventors: Daniel P. Goepp, Boston, MA (US); Eric Anderson, Grafton, MA (US)

(73) Assignee: EDIFIRE LLC, Boston, MA (US)

( * ) Notice: Subject to any disclaimer, the term of this patent is extended or adjusted under 35 U.S.C. 154(b) by 0 days.

(21) Appl. No.: 15/063,294

(22) Filed: Mar. 7, 2016

(65) Prior Publication Data

US 2016/0191580 A1 Jun. 30, 2016

Related U.S. Application Data

(63) Continuation of application No. 14/500,461, filed on Sep. 29, 2014, now Pat. No. 9,282,130.

(51) Int. Cl.
| | |
|---|---|
| *H04L 29/06* | (2006.01) |
| *H04L 12/911* | (2013.01) |
| *H04L 12/26* | (2006.01) |
| *H04L 12/18* | (2006.01) |

(Continued)

(52) U.S. Cl.
CPC ........ *H04L 65/403* (2013.01); *H04L 12/1818* (2013.01); *H04L 12/1827* (2013.01); *H04L 43/08* (2013.01); *H04L 47/70* (2013.01); *H04L 65/1089* (2013.01); *H04L 65/4038* (2013.01); *H04L 65/80* (2013.01); *H04L 47/15* (2013.01); *H04L 47/2416* (2013.01)

(58) Field of Classification Search
CPC ............. H04L 12/1818; H04L 12/1827; H04L 65/403; H04L 65/1089; H04L 43/08; H04L 65/80; H04L 47/70; H04L 65/4038; H04L 47/15; H04L 47/2416
USPC .......................................... 709/246; 370/260
See application file for complete search history.

(56) References Cited

U.S. PATENT DOCUMENTS

| | | | | |
|---|---|---|---|---|
| 5,999,966 A | * | 12/1999 | McDougall | ........... H04M 3/567 348/14.09 |
| 2004/0047342 A1 | * | 3/2004 | Gavish | ................ H04L 12/1813 370/352 |

(Continued)

FOREIGN PATENT DOCUMENTS

CN WO 2009129712 A1 * 10/2009 ........... H04L 47/724

*Primary Examiner* — Kostas Katsikis
(74) *Attorney, Agent, or Firm* — Proskauer Rose LLP

(57) ABSTRACT

Methods and apparatuses, including computer program products, are described for monitoring conference session resources in a media-based conferencing system. A server computing device establishes a connection to media engines hosting in-process conference sessions. The server periodically captures system level information, application level information, and meeting size associated with each of the conference sessions. The server determines a session state associated with each of the conference sessions, and determines a pool of available computing devices to provide resources to the conference sessions. The server allocates available computing devices to the in-process conference sessions based upon the session state and periodically reports the session state and the pool of available computing devices to a network API module, which determines a routing for subsequent communication session requests based upon the reported session state and pool of available computing resources.

11 Claims, 10 Drawing Sheets

(51) Int. Cl.
 *H04L 12/801* (2013.01)
 *H04L 12/853* (2013.01)

(56) References Cited

U.S. PATENT DOCUMENTS

2004/0105395 A1* 6/2004 Friedrich ................ H04M 3/56
 370/261
2007/0291108 A1* 12/2007 Huber ...................... H04N 7/15
 348/14.02
2008/0120381 A1* 5/2008 Awan ..................... G06Q 10/10
 709/206
2008/0298278 A1* 12/2008 Thakkar ................ H04M 3/567
 370/260

* cited by examiner

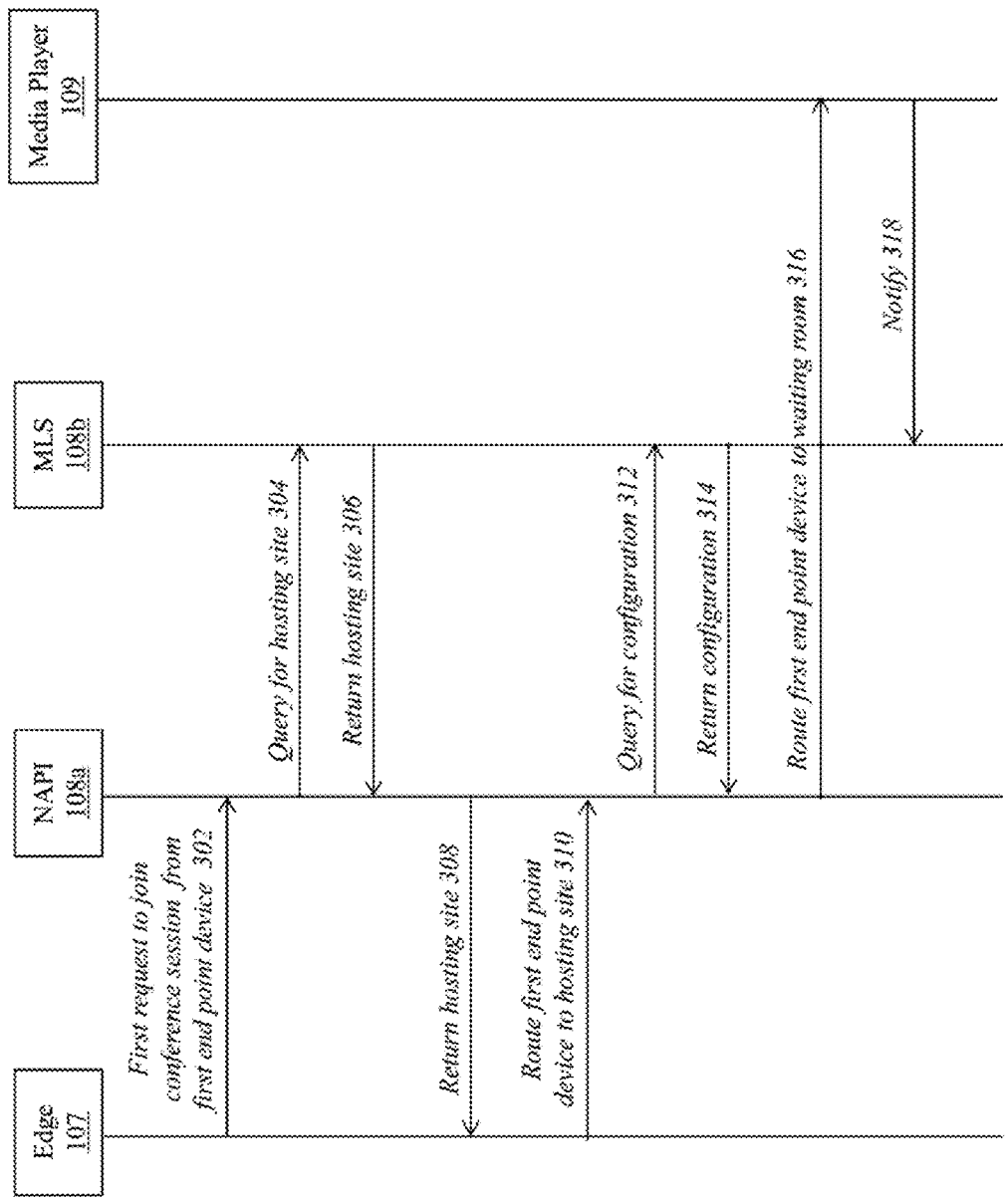

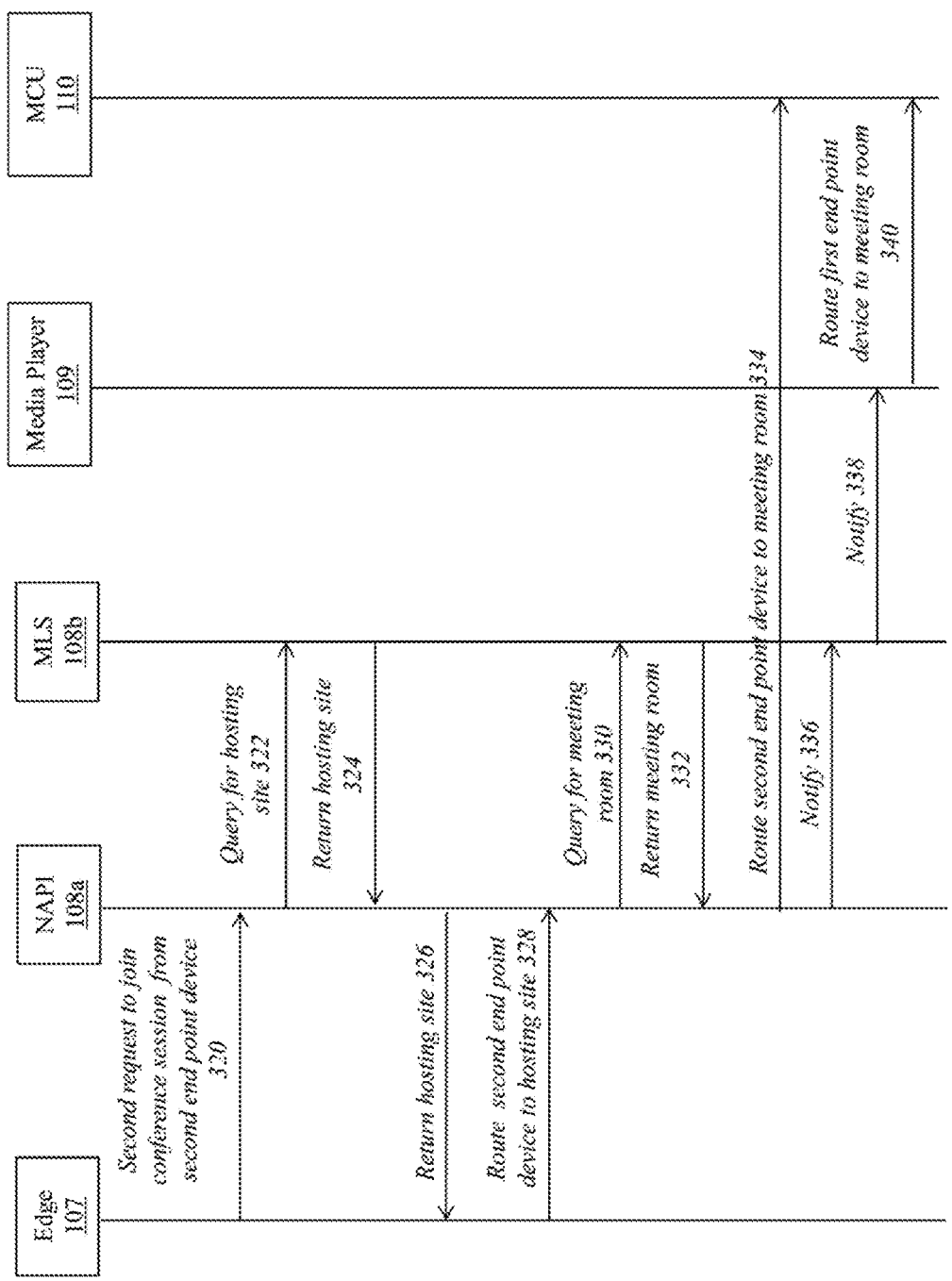

DYNAMIC SESSION MONITORING IN SECURE MEDIA-BASED CONFERENCING

RELATED APPLICATIONS

This application is a continuation of U.S. patent application Ser. No. 14/500,461, filed on Sep. 29, 2014.

TECHNICAL FIELD

This application relates generally to methods and apparatuses, including computer program products, for dynamic session monitoring in secure media-based conferencing.

BACKGROUND

Media-based (i.e., video and/or audio) conferencing has traditionally lacked dynamic resource allocation, monitoring, data storage, session movement, and media negotiation features. Typically, conference calls occur over private, statically constructed networks between end point devices that are known to the network and conferencing system, and have already been authenticated. In some cases, these private networks operate on a proprietary software and/or hardware platform from a specific vendor, making it difficult for end point devices outside of the scope of the proprietary technology to access the conferencing platform.

In addition, conferencing resources such as meeting rooms, IVRs, and routing functionality are often pre-configured in private networks based upon an expected usage of the conferencing system and can be difficult and costly to adapt in the face of changing network demands and unexpected resource usage.

SUMMARY

Therefore, what is needed are methods and systems to conduct dynamic resource allocation, data storage, conference session monitoring and media negotiation for media-based conferencing while offering a robust feature set that provides call enhancement features such as interactive voice response (IVR) functionality and auto attendance, call security features such as password management, multi-factor authentication and authorization of end points (including filtering and allow/deny functionality), and call compliance features such as recording options, regulatory rules, and other retention/surveillance features. The systems and methods described herein provide the advantage of providing dynamic decision-making with respect to routing, permissions, authentication, and the like. The systems and methods described herein provide the advantage of media-based conferencing with seamless interoperability between end points operating on varying types of software and hardware platforms.

The systems and methods described herein provide the advantage of dynamically allocating hardware and software resources of the system to ensure availability and efficient routing of media-based conference calls. For example, the hardware and software resources allocated by the systems and methods described herein can be resident on a plurality of geographically-dispersed and independent nodes (e.g., not in the same physical area) that communicate via a mesh-based framework. This attribute enables the system to provide the advantage of a componentized call system, instead of the traditional 'single-box' systems commonly used. Further, the processes and modules that comprise the system can operate independently of each other, without relying on other nodes or modules of the system, in making decisions about which actions to take with respect to a given conference call, end point device, or user. The systems and methods described herein achieve the advantage of disassociating the 'conference call' from any specific physical infrastructure.

The invention, in one aspect, features a method of allocating resources in a media-based conference session. A server computing device receives a first request to join a conference session from a first end point device associated with a non-organizer participant in the conference session, the first request including a first media stream from the first end point device. The server computing device determines a hosting site of the conference session by querying a media location service based upon the first request and determines configuration attributes of the conference session by querying a database at the hosting site based upon the first request. The server computing device connects the media stream of the first end point device to a waiting room at the hosting site. The server computing device receives a second request to join the conference session from a second end point device associated with an organizer of the conference session, the second request including a second media stream from the second end point device. The server computing device determines a meeting room for the conference session at the hosting site by querying the media location service based upon the second request and establishes the conference session by transferring the first media stream and the second media stream into the meeting room.

The invention, in another aspect, features a system for allocating resources in a media-based conferencing session. The system comprises a server computing device configured to receive a first request to join a conference session from a first end point device associated with a non-organizer participant in the conference session, the first request including a first media stream from the first end point device. The server computing device is further configured to determine a hosting site of the conference session by querying a media location service based upon the first request and determine configuration attributes of the conference session by querying a database at the hosting site based upon the first request. The server computing device is further configured to connect the media stream of the first end point device to a waiting room at the hosting site. The server computing device is further configured to receive a second request to join the conference session from a second end point device associated with an organizer of the conference session, the second request including a second media stream from the second end point device. The server computing device is further configured to determine a meeting room for the conference session at the hosting site by querying the media location service based upon the second request, and establish the conference session by transferring the first media stream and the second media stream into the meeting room.

The invention, in another aspect, features a computer program product, tangibly embodied in a non-transitory computer readable storage medium, for allocating resources in a media-based conferencing session. The computer program product includes instructions operable to cause a server computing device to receive a first request to join a conference session from a first end point device associated with a non-organizer participant in the conference session, the first request including a first media stream from the first end point device. The computer program product includes further instructions operable to cause the server computing device to determine a hosting site of the conference session by querying a media location service based upon the first request and determine configuration attributes of the conference session by querying a database at the hosting site based upon the first request. The computer program product includes further instructions operable to cause the server computing device to connect the media stream of the first end point device to a waiting room at the hosting site. The computer program product includes further instructions operable to cause the server computing device to receive a second request to join the conference session from a second end point device associated with an organizer of the conference session, the second request including a second media stream from the second end point device. The computer program product includes further instructions operable to cause the server computing device to determine a meeting room for the conference session at the hosting site by querying the media location service based upon the second request, and establish the conference session by transferring the first media stream and the second media stream into the meeting room.

Any of the above aspects can include one or more of the following features. In some embodiments, the hosting site of the conference session comprises one or more of a geographical location of computing devices used to host the conference session and a logical location of computing devices used to host the conference session. In some embodiments, the configuration attributes comprise one or more of authentication data, session organizer data, session participant data, session media capability data, and session feature data. In some embodiments, the waiting room comprises an interactive voice response (IVR) system.

In some embodiments, determining a hosting site of the conference session comprises retrieving a list of available hosting sites from the media location service and selecting a hosting site based upon a location of the first end point device. In some embodiments, determining a hosting site of the conference session comprises retrieving a list of available hosting sites from the media location service and selecting a hosting site based upon the organizer of the conference session.

In some embodiments, determining a meeting room for the conference session at the hosting site comprises retrieving a list of available meeting rooms from the media location service and selecting a meeting room based upon resources required to establish the conference session. In some embodiments, the server computing device identifies the non-organizer participant by querying a user profile database based upon the first request. In some embodiments, the server computing device connects to a third end point device and transferring a third media stream from the third end point device into the meeting room.

In some embodiments, the first request comprises first authentication credentials associated with the non-organizer participant and the server computing device determines whether to connect the first end point device to the meeting room based upon the first authentication credentials. In some embodiments, the second request comprises second authentication credentials associated with the organizer and the server computing device determines whether to establish conference session based upon the second authentication credentials.

The invention, in another aspect, features a method of managing session state for a plurality of media-based conference sessions. A server computing device receives a first request to update a data element in a primary in-memory data structure, the request comprising an update to the data element associated with a session state of one or more in-process media-based conference sessions. The server computing device blocks subsequent requests to update the data element that are received after the first request and stores the blocked requests sequentially in a temporary queue based upon a timestamp associated with each blocked request. The server computing device replicates the update to the data element to a secondary in-memory data structure. The server computing device updates the data element in the primary in-memory data structure based upon the update to the data element in the first request, and processes the blocked requests based upon the timestamp upon completion of the replication step.

The invention, in another aspect, features a system for managing session state for a plurality of media-based conference sessions. The system comprises a server computing device configured to receive a first request to update a data element in a primary in-memory data structure, the request comprising an update to the data element associated with a session state of one or more in-process media-based conference sessions. The server computing device is further configured to block subsequent requests to update the data element that are received after the first request and storing the blocked requests sequentially in a temporary queue based upon a timestamp associated with each blocked request. The server computing device is further configured to replicate the update to the data element to a secondary in-memory data structure. The server computing device is further configured to update the data element in the primary in-memory data structure based upon the update to the data element in the first request, and process the blocked requests based upon the timestamp upon completion of the replication step.

The invention, in another aspect, features a computer program product, tangibly embodied in a non-transitory computer readable storage medium, for managing session state for a plurality of media-based conference sessions. The computer program product includes instructions operable to cause a server computing device to receive a first request to update a data element in a primary in-memory data structure, the request comprising an update to the data element associated with a session state of one or more in-process media-based conference sessions. The computer program product includes further instructions operable to cause the server computing device to block subsequent requests to update the data element that are received after the first request and storing the blocked requests sequentially in a temporary queue based upon a timestamp associated with each blocked request. The computer program product includes further instructions operable to cause the server computing device to replicate the update to the data element to a secondary in-memory data structure. The computer program product includes further instructions operable to cause the server computing device to update the data element in the primary in-memory data structure based upon the update to the data element in the first request, and process the blocked requests based upon the timestamp upon completion of the replication step.

Any of the above aspects can include one or more of the following features. In some embodiments, the server computing device replicates the update to the data element to one or more data stores coupled to the in-memory data structures prior to processing the blocked requests. In some embodiments, the server computing device indexes the in-memory data structures. In some embodiments, indexing comprises assigning a timestamp to each data element in the in-memory data structures. In some embodiments, the server computing device compares the timestamps assigned to a corresponding data element in each of (i) the primary in-memory data structure and (ii) the secondary in-memory data structure, to determine whether the in-memory data structures are synchronized.

In some embodiments, the server computing device determines a conflict in the corresponding data elements based upon the comparison step and updating the data element having the earlier timestamp to match the data element having the later timestamp. In some embodiments, the server computing device determines a conflict in the corresponding data elements based upon the comparison step and deleting both corresponding data elements.

In some embodiments, the server computing device initializes the primary in-memory data structure by loading persistent data elements into the primary in-memory data structure from the one or more data stores. In some embodiments, the persistent data elements comprise one or more of conference session room data and multipoint control unit resource availability. In some embodiments, the session state of one or more in-process media-based conference sessions comprises identity of a multipoint control unit to which the conference session is assigned. In some embodiments, the server computing device determines that the primary in-memory data structure is offline and updates the data element in the secondary in-memory data structure based upon the first request.

The invention, in another aspect, features a computerized method for rerouting a media-based conference session. A server computing device determines a condition associated with a first conference session between a plurality of end point devices each connected to the server computing device via an external media stream and each connected from the server computing device to a first multipoint control unit via a first internal media stream, where the condition indicates that a new multipoint control unit is required. The server computing device identifies a second multipoint control unit available to host a second conference session between the plurality of end point devices. The server computing device disconnects the first internal media streams from the first multipoint control unit while the external media streams remain connected. The server computing device connects each of the plurality of end point devices from the server computing device to the second multipoint control unit via a second internal media stream. The server computing device establishes the second conference session on the second multipoint control unit between the plurality of end point devices.

The invention, in another aspect, features a system for rerouting a media-based conference session. The system comprises a server computing device configured to determine a condition associated with a first conference session between a plurality of end point devices each connected to the server computing device via an external media stream and each connected from the server computing device to a first multipoint control unit via a first internal media stream, where the condition indicates that a new multipoint control unit is required. The server computing device is further configured to identify a second multipoint control unit available to host a second conference session between the plurality of end point devices. The server computing device is further configured to disconnect the first internal media streams from the first multipoint control unit while the external media streams remain connected. The server computing device is further configured to connect each of the plurality of end point devices from the server computing device to the second multipoint control unit via a second internal media stream, and establish the second conference session on the second multipoint control unit between the plurality of end point devices.

The invention, in another aspect, features a computer program product, tangibly embodied in a non-transitory computer readable storage medium, for rerouting a media-based conference session. The computer program product includes instructions operable to cause a server computing device to determine a condition associated with a first conference session between a plurality of end point devices each connected to the server computing device via an external media stream and each connected from the server computing device to a first multipoint control unit via a first internal media stream, where the condition indicates that a new multipoint control unit is required. The computer program product includes further instructions operable to cause the server computing device to identify a second multipoint control unit available to host a second conference session between the plurality of end point devices. The computer program product includes further instructions operable to cause the server computing device to disconnect the first internal media streams from the first multipoint control unit while the external media streams remain connected. The computer program product includes further instructions operable to cause the server computing device to connect each of the plurality of end point devices from the server computing device to the second multipoint control unit via a second internal media stream, and establish the second conference session on the second multipoint control unit between the plurality of end point devices.

Any of the above aspects can include one or more of the following features. In some embodiments, the condition comprises one or more of a failure of the first multipoint control unit, a count of end point devices in the first conference session exceeding a predetermined limit, and a resource load generated from the first conference session exceeding a predetermined limit. In some embodiments, the server computing device notifies the plurality of end point devices prior to disconnecting the first internal media streams from the first multipoint control unit.

In some embodiments, identifying a second multipoint control unit available to host a second conference session comprises determining a location of the second multipoint control unit. In some embodiments, identifying a second multipoint control unit available to host a second conference session comprises analyzing the first conference session to determine session requirements and determining whether the second multipoint control unit is capable of meeting the session requirements. In some embodiments, the session requirements comprise one or more of a count of the end point devices participating in the first conference session, a media bandwidth consumed by the end point devices participating in the first conference session, a geographical location of the first multipoint control unit, and a media protocol used by at least one of the plurality of end point devices participating in the first conference session.

In some embodiments, identifying a second multipoint control unit available to host a second conference session comprises determining a list of multipoint control units and selecting a multipoint control unit from the list based upon a current resource usage associated with each of the multipoint control units. In some embodiments, disconnecting the first internal media streams from the first multipoint control unit comprises transmitting media to the plurality of end point devices via the external media stream so that the external media stream remains active.

In some embodiments, the steps are performed in real time. In some embodiments, the server computer device waits for the condition associated with the first conference session to resolve prior to identifying a second multipoint control unit available to host a second conference session. In some embodiments, the server computing device waits for a predetermined period of time.

The invention, in another aspect, features a method of negotiating media capabilities between a plurality of end point devices in a media-based conference session. A server computing device receives a request to join a conference session between a plurality of end point devices, the request received from a first end point device and comprising a media flow from the first end point device. The server computing device identifies at least one of the first end point device and a network from which the first end point device sent the request. The server computing device determines whether a first media negotiation profile associated with the identified first end point device exists. The server computing device determines whether a second media negotiation profile associated with the identified network exists. The server computing device adjusts one or more of a bitrate of the media flow, a session description of the media flow, and a destination multipoint control unit for the media flow, based upon the first media negotiation profile and the second media negotiation profile. The server computing device connects the adjusted media flow from the first end point device to the conference session.

The invention, in another aspect, features a system for negotiating media capabilities between a plurality of end point devices in a media-based conference session. The system comprises a server computing device configured to receive a request to join a conference session between a plurality of end point devices, the request received from a first end point device and comprising a media flow from the first end point device. The server computing device is further configured to identify at least one of the first end point device and a network from which the first end point device sent the request. The server computing device is further configured to determine whether a first media negotiation profile associated with the identified first end point device exists. The server computing device is further configured to determine whether a second media negotiation profile associated with the identified network exists. The server computing device is further configured to adjust one or more of a bitrate of the media flow, a session description of the media flow, and a destination multipoint control unit for the media flow, based upon the first media negotiation profile and the second media negotiation profile. The server computing device is further configured to connect the adjusted media flow from the first end point device to the conference session.

The invention, in another aspect, features a computer program product, tangibly embodied in a non-transitory computer readable storage medium, for negotiating media capabilities between a plurality of end point devices in a media-based conference session. The computer program product includes instructions operable to cause a server computing device to receive a request to join a conference session between a plurality of end point devices, the request received from a first end point device and comprising a media flow from the first end point device. The computer program product includes further instructions operable to cause the server computing device to identify at least one of the first end point device and a network from which the first end point device sent the request. The computer program product includes further instructions operable to cause the server computing device to determine whether a first media negotiation profile associated with the identified first end point device exists. The computer program product includes further instructions operable to cause the server computing device to determine whether a second media negotiation profile associated with the identified network exists. The computer program product includes further instructions operable to cause the server computing device to adjust one or more of a bitrate of the media flow, a session description of the media flow, and a destination multipoint control unit for the media flow, based upon the first media negotiation profile and the second media negotiation profile. The computer program product includes further instructions operable to cause the server computing device to connect the adjusted media flow from the first end point device to the conference session.

Any of the above aspects can include one or more of the following features. In some embodiments, determining whether a first media negotiation profile associated with the identified first end point device exists comprises retrieving, by the server computing device from a database, the first media negotiation profile based upon an identifier associated with the first end point device. In some embodiments, determining whether a second media negotiation profile associated with the identified network exists comprises retrieving, by the server computing device from a database, the second media negotiation profile based upon an identifier associated with the network.

In some embodiments, adjusting the session description comprises determining whether one or more features listed in the session description are supported for the conference session and modifying the session description to remove features that are not supported for the conference session. In some embodiments, the one or more features comprise a codec supported by the first end point device. In some embodiments, the one or more features comprise a signaling capability supported by the first end point device. In some embodiments, the media flow is not adjusted if the first media negotiation profile and the second media negotiation profile do not exist.

In some embodiments, the server computing device periodically analyzes quality metrics associated with the media flow from the first end point device during the conference session. In some embodiments, the server computing device adjusts one or more of a bitrate of the media flow, a session description of the media flow, and a destination multipoint control unit for the media flow, based upon the analysis of the quality metrics. In some embodiments, the quality metrics comprise one or more of resolution, jitter, and latency. In some embodiments, the server computing device updates at least one of the first media negotiation profile and the second media negotiation profile based upon the analysis of the quality metrics. In some embodiments, the server computing device transfers the media flow from the first end point device to another multipoint control unit based upon the analysis of the quality metrics.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 3A-3B are workflow diagrams of a method of allocating resources in a media-based conference session.

DETAILED DESCRIPTION

Figure 1:
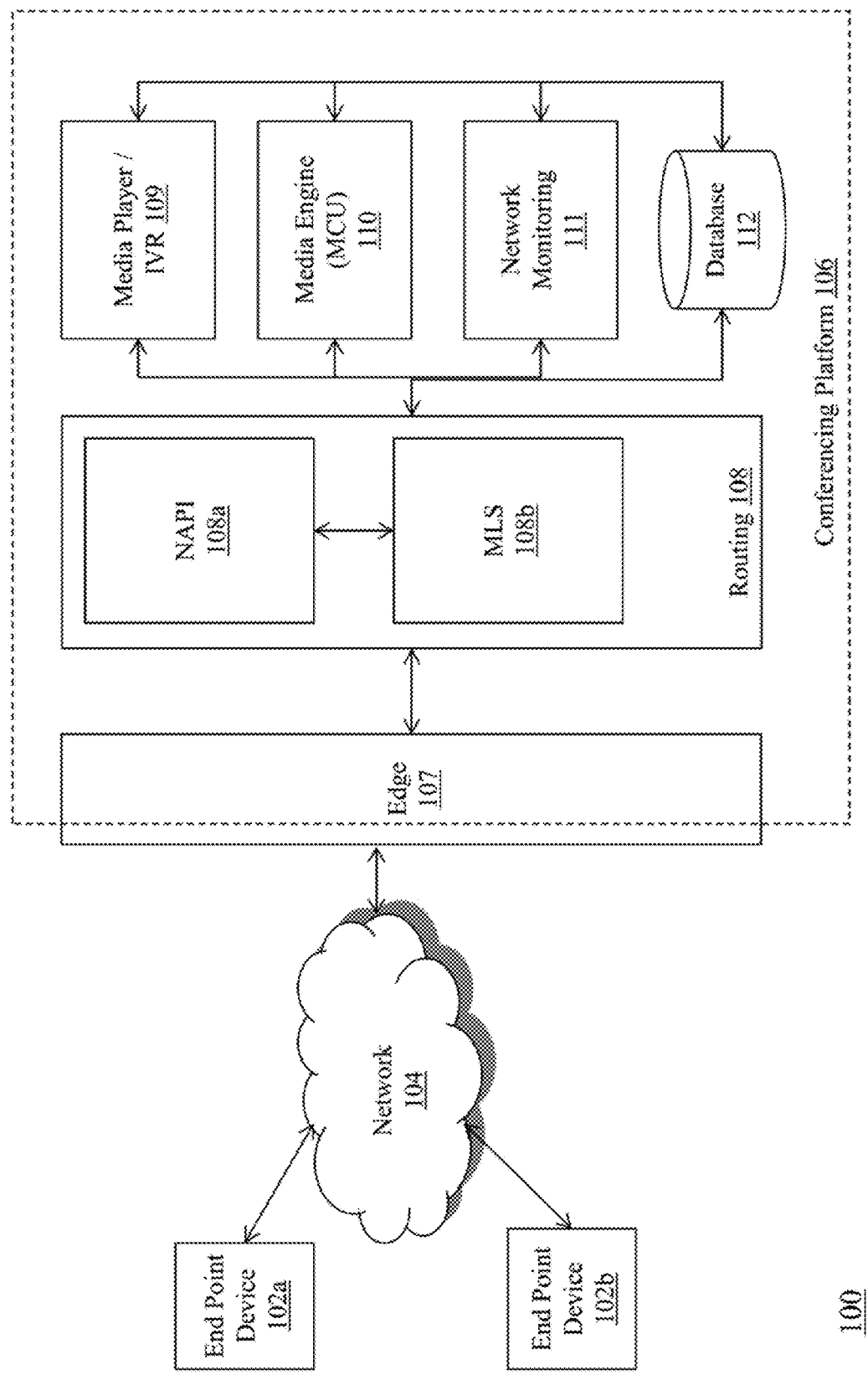
FIG. 1 is a block diagram of a system for allocating resources in a media-based conference session, managing session state for a plurality of media-based conference sessions, rerouting a media-based conference session, and negotiating media capabilities between a plurality of end point devices in a media-based conference session.

FIG. 1 is a block diagram of a system 100 for allocating resources in a media-based conference session, managing session state for a plurality of media-based conference sessions, rerouting a media-based conference session, and negotiating media capabilities between a plurality of end point devices in a media-based conference session. The system 100 includes a plurality of end point devices 102a-102b, a communications network 104, a conferencing platform 106 that includes an edge module 107, a routing module 108 with a network API (NAPI) module 108a and a media location service module 108b, a media player/interactive voice response (IVR) module 109, a media engine/multipoint control unit (MCU) 110, a network monitoring module 111, and a database 112.

The plurality of end point devices 102a-102b connect to the conferencing platform 106 via the communications network 104 in order to initiate and participate in conference calls and other media communication sessions with other end point devices. Exemplary end point devices include desktop computers, laptop computers, tablets, mobile devices, smartphones, and internet appliances. It should be appreciated that other types of computing devices that are capable of connecting to the conferencing platform 106 can be used without departing from the scope of invention. In some embodiments, the end point devices 102a-102b are capable of executing call conferencing client software locally and/or using another type of user interface (e.g., a web browser) to connect to the conferencing platform 106. The call conferencing client software can be open network, free-to-use/freemium software, such as Skype™ available from Microsoft Corp. of Redmond, Wash. or Google™ Hangouts available from Google, Inc. of Mountain View, Calif., or purchasable, closed network software, such as the RealPresence® platform available from Polycom, Inc. of San Jose, Calif. In some embodiments, the call conferencing client software can be a proprietary platform developed, e.g., by a corporation for use internally. Although FIG. 1 depicts two end point devices 102a-102b, it should be appreciated that the system 100 can include any number of end point devices.

The communication network 104 enables the end point devices 102a-102b to communicate with the conferencing platform 106 in order to initiate and participate in media-based conference calls and meetings. The network 104 may be a local network, such as a LAN, or a wide area network, such as the Internet and/or a cellular network. In some embodiments, the network 104 is comprised of several discrete networks and/or sub-networks (e.g., cellular Internet) that enable the end point devices 102a-102b to communicate with the conferencing platform 106.

The conferencing platform 106 is a combination of hardware and software modules that establish, authorize, allocate resources for, monitor, facilitate and manage media-based conference calls and meetings between a plurality of end point devices 102a-102b. The conferencing platform 106 includes an edge module 107, a routing module 108 with a network API (NAPI) module 108a and a media location service module 108b, a media player/interactive voice response (IVR) module 109, a media engine/multipoint control unit (MCU) 110, a network monitoring module 111, and a database 112. The modules 107, 108, 109, 110, and 111 are hardware and/or software modules that reside in the conferencing platform 106 to perform functions associated with establishing, authorizing, allocating resources for, monitoring, facilitating, and managing media-based conference calls and meetings. In some embodiments, the functionality of the modules 107, 108, 109, 110, and 111 is distributed among a plurality of computing devices. It should be appreciated that any number of computing devices, arranged in a variety of architectures, resources, and configurations (e.g., cluster computing, virtual computing, cloud computing) can be used without departing from the scope of the invention. For example, the conferencing platform 106 can comprise a plurality of different sites that maintain one or more instances of each module 107, 108, 109, 110 and 111. The sites can be distributed in different geographical locations, and the distributed geography of the platform 106 can be leveraged to improve conference session availability, quality, and resilience (e.g., sessions can be hosted at a particular site that is close to all or the majority of the participants).

It should also be appreciated that, in some embodiments, the functionality of the modules 107, 108, 109, 110, and 111 can be distributed such that any of the modules 107, 108, 109, 110, and 111 are capable of performing any of the functions described herein without departing from the scope of the invention. Also, although FIG. 1 depicts a single instance of each module 107, 108, 109, 110, and 111, it should be appreciated that there can be any number of instances of each module 107, 108, 109, 110, and 111 that operate in conjunction with each other or independently without departing from the scope of invention.

The edge module 107 is coupled between the network 104 and the routing module 108. The edge module 107 is the entry point for conference session requests and calls to the conferencing platform 106. The edge module 107 receives signaling communications in various protocols (e.g., Session Initiation Protocol (SIP), h.323) from the end point devices 102a-102b via network 104 that relate to the establishment and maintenance of media-based conference sessions. It should be appreciated that other signaling protocols can be used without departing from the scope of invention. The edge module 107 receives the signaling communications from the end point devices 102a-102b and transmits the signaling to the other components of the conferencing platform 106 for further processing. As shown in FIG. 1, a portion of the edge module 107 is external facing (i.e., outside of the conferencing platform 106) and a portion of the edge module is internal facing (i.e., inside the conferencing system). The external facing portion of the edge module 107 receives the communications from the end point devices 102a-102b and performs operations associated with authentication, authorization, permissioning, user profiling, malware detection, and maintaining a signaling/media connection with the end point devices 102a-102b.

In some embodiments, the edge module 107 translates the signaling into another format that can be processed by the other components of the conferencing platform 106. For example, the edge module 107 can translate the signaling into XML format, including items such as call details (e.g., to, from, domain), end point device-specific details, user-specific details, and other types of information, thereby offering additional customization of the signaling to enable the other components of the conferencing platform 106 to process the conference session in a dynamic way for each end point device 102a-102b.

Upon receiving the signaling and media for a conference session request from an end point device 102a, 102b, the edge module 107 communicates with the routing module 108 to determine how the request should be handled and routed to establishing the conference session (e.g., the characteristics of the conference session requested by the end point device 102a, 102b, which MCU 110 should be allocated to host the conference session, and the like). Specifically, the routing module 108 includes two sub-modules: a network API (NAPI) module 108a and a media location service (MLS) module 108b.

The NAPI module 108a operates as a unified interfacing framework to connect each of the components of the conferencing platform 106. The NAPI module 108a is an application programming interface (API)-based routing service that processes data requests from other components/services in the conferencing platform 106, and manages the initial routing and permissions of conference sessions based upon information provided from other modules like the MLS module 108b and also internal logic maintained by the NAPI module 108a. This includes access control, meeting profile and conference session routing information. For example, the NAPI module 108a can instruct the edge module 107 regarding what is or what is not allowed with respect to a particular conference session. In another example, the NAPI module 108a can retrieve room profile information (e.g., from database 112 and/or MLS module 108b) and use it to determine to which media engine 110 the call should be routed. An advantage of maintaining the NAPI module 108a as the unified interface to the other components of the conferencing platform 106 is that when changes are required to the communication methodologies or workflows between the components of the platform 106, only the NAPI module 108a needs to be updated—thereby making changes and upgrades focused and efficient.

The MLS module 108b operates to manage the conference session resources that are selected for use in a particular conference session (e.g., which media engine 110 should host the session), and where to move a session when an event or condition occurs that requests or requires a move to a different media engine. The MLS module 108b leverages conference session state information received from the network monitoring module 111 in order to understand the current resource usage of the conferencing platform 106 and how to allocate or route incoming session requests. The MLS module 108b also tracks, e.g., which edge module 107 each session request or call is being handled by, and which media engine 110 meetings and participants are currently being hosted on.

In some embodiments, the routing module 108 can be considered a set of dynamic signal routing (DSR) capabilities within the conferencing platform 106 that routes video and/or audio signaling to enable a number of benefits:
  Higher conference session/call connectivity rates (e.g., do not route calls to resources which are not available);
  Fewer dropped sessions/calls;
  More efficient use of platform resources; and
  Improved session/call quality.

In some embodiments, the routing module 108 is a broker for routing decisions and service configuration in the conferencing platform 106. For example, the edge module 107 leverages the routing module 108 to know if a conference session exists or not. The media player/IVR module 109 leverage routing module 108 to access conference session profile data. The media engine 110 interacts with routing module 108 to notify other components of the conferencing platform 106 that a conference session/meeting room has started (e.g., with the organizer attending) so participants that are waiting can join the room.

In some embodiment, the routing module 108 provides a unified interface to dynamic backend systems that enables:
  A common interface to back-end components—resulting in reduced complexity of the back-end components as they only have to support communication with the routing module 108 (and not all of the various components in the conferencing platform 106);
  A highly-available service model—the DSR capabilities of the routing module 108 provides a stateless messaging/data broker methodology that can be highly available and deployed in a model supporting numerous load-balancing techniques including but not limited to round robin and active-passive, and also support failover techniques;
  The ability to route a call at the global platform level to a specific site or environment within the platform;
  Within the selected site, the routing module 108 can leverage multiple services to identify device and meeting room set-up requirements (including IVR, authentication, room-specific codec support, and the like) to identify/configure a conference session path that ensures or increases the likelihood of uninterrupted, high-quality conference operation; and
  The routing module 108 can utilize the MLS module 108b to identify conference session status (e.g., in progress or not) as well as what media engine(s)/MCU(s) 110 a session should be hosted on or to which media engine(s)/MCU(s) a particular end point device 102a should be routed to initialize the conference session.

Exemplary capabilities that the routing module 108 provides for include:
  Getting a list of all conference sessions in-progress on the conferencing platform 106;
  Getting a list of participants for a specific conference session;
  Find out if a participant is an organizer of the conference session;
  Mute or disconnect a specific participant (or participants) in a conference session;
  Out-dial to a specific participant from a conference session; and
  Mapping anonymous users from the external network to a known user on the conferencing platform 106—e.g., translating an incoming session request from an anonymous user to a known conferencing platform 106 user based on characteristics of the end point device 102*a* such as client name, location, authenticated session, and the like.

The media player/IVR module 109 operates as temporary location for streams from end point devices 102*a*-102*b* as the other components of the conferencing platform 106 determine where and how to route/host the conference session. For example, the NAPI module 108*a* can instruct the edge module 107 to route the end point device 102*a* to the media player/IVR module 109 as a waiting room (e.g., and play hold music) while the conference session is being established on a media engine. Once the conference session is ready, the NAPI module 108*a* can instruct the edge module 107 and/or the media player/IVR module 109 to route the end point device 102*a* to the hosting media engine 110. In another example, the media player/IVR module 109 can be used to collect additional information from a participant on a conference session (e.g., PIN, user identity, and the like) before connecting the end point device 102*a* to the conference session.

The media engine 110 operates as a bridge the plurality of end point devices 102*a*-102*b* participating in a media-based conference session or meeting. The media engine 110 acts as the final destination for conference sessions and calls in the conferencing platform 106. The media engine 110 receives audio and/or video streams originating from end point devices 102*a*-102*b* participating in a conference session, mixes and transcodes the streams, and streams back out new media (e.g., a composite stream comprising all of the relevant audio and/or video streams of the participants) back out to the end point devices 102*a*-102*b*. It should be appreciated that the media engine 110 can support a number of different capabilities—including video and audio mixing, media playback, recording, and the like. In some embodiments, the media engine 110 is a multipoint control unit (MCU). An example MCU that can be incorporated into the media engine 110 is Codian, available from Cisco Systems, Inc. in San Jose, Calif. The MCU can be integrated with Vidtel Gateway, available from Vidtel, Inc. of Sunnyvale, Calif., to provide additional features.

The network monitoring module 111 operates as a framework to monitor various data points associated with the conference sessions in order to provide a live data picture of the media services (e.g., meetings, participants) on the conferencing platform 106. For example, data points collected by the network monitoring module can include:

System level information—such as CPU, memory and network utilization, and server/service availability to generate a pool of available computing devices that can provide media mixing or other services for a particular conference session;

Application level information—such as active conference sessions/meetings and participants; can also include further details regarding each participant such as call bitrate, resolution, and the like;

Meeting size—relating to network optimization and service quality. For example, many smaller meetings (i.e., fewer participants) can go on a first pool of servers, but the conferencing platform 106 can allocate a separate pool of servers to handle larger meetings that may require more resources (e.g., bandwidth, processing power, high resolution), and the separate pool of servers should not handle multiple calls at the same time. In this example, once a meeting reaches a certain threshold, the meeting would get moved to a dedicated server.

The conferencing platform 106 also includes a database 112. The database 112 is stores data used by the conferencing platform 106 to perform the media-based conferencing functionality. The database 112 can be integrated on a computing device with other components of the conferencing platform 106 or be located on a computing device that is separate from the other components of the conferencing platform 106. An example database that can be used with the conferencing platform 106 is MySQL™ available from Oracle Corp. of Redwood City, Calif. Also, although FIG. 1 depicts a single database 112, it should be appreciated that there can be any number of databases or instances of databases (e.g., using database sharding techniques) that operate in conjunction with each other or independently without departing from the scope of invention.

Dynamic Resource Allocation/Signal Routing

Figure 2:
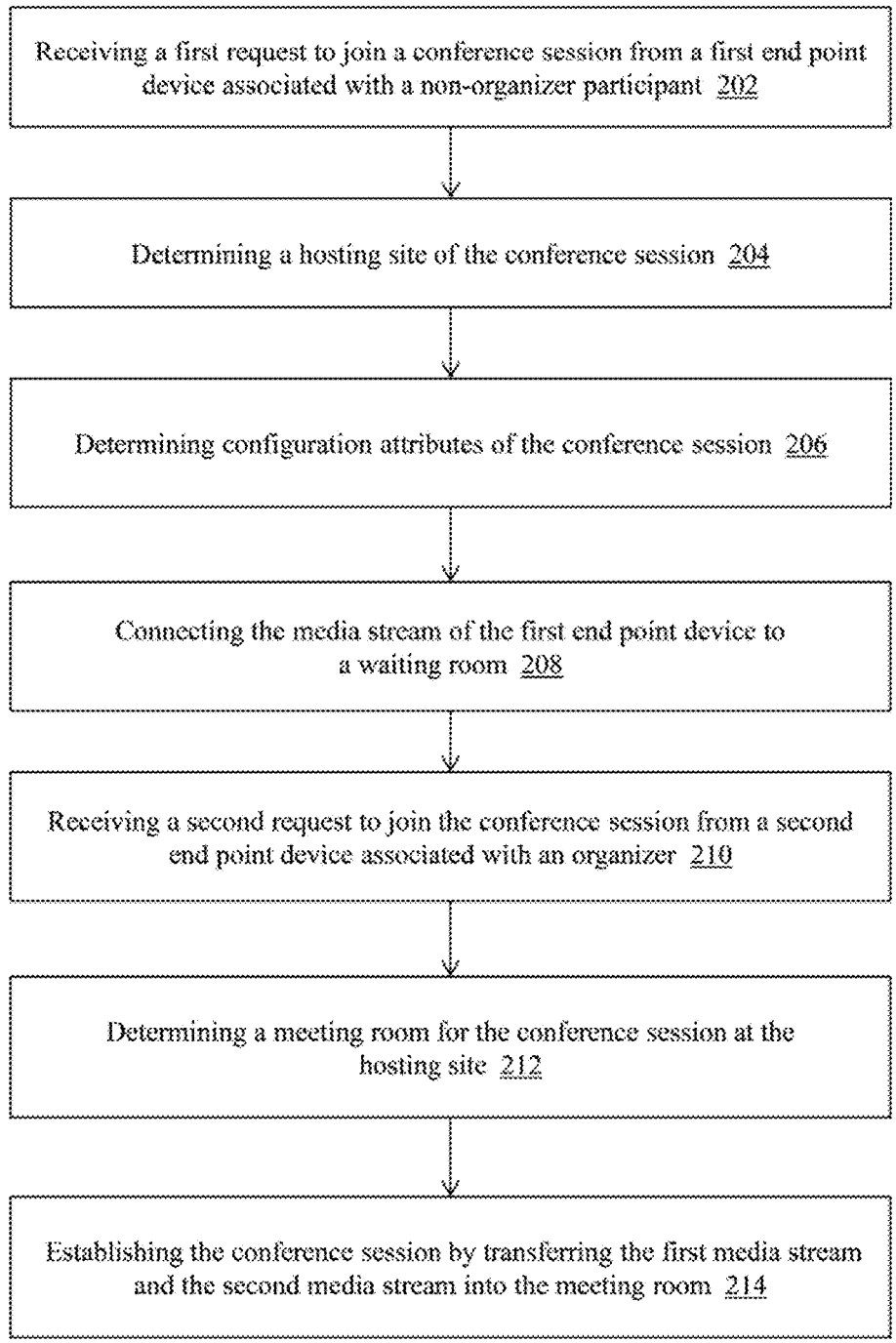
FIG. 2 is a flow diagram of a method of allocating resources in a media-based conference session.

FIG. 2 is a flow diagram of a method 200 of allocating resources in a media-based conference session, using the system 100 of FIG. 1. The edge module 107 receives (202) a first request to join a conference session from a first end point device 102*a* associated with a non-organizer participant. A non-organizer participant is an individual who is eligible to join and participate in the conference session but is not the leader or organizer of the session (e.g., the person 'hosting' the session). The edge module 107 transmits a request to look up the location (e.g., hosting site) of the conference session to the NAPI module 108*a*, and the NAPI module 108*a* determines (204) a hosting site of the conference session. For example, the NAPI module can use its own internal logic as well as information provided by the MLS module 108*b* to determine a preferred or optimal hosting site for the conference session. The NAPI module 108*a* returns the selected hosting site to the edge module 107, and the edge module 107 routes the request from the first end point device 102*a* to the hosting site (e.g., to a routing module 108*a* at another site in the conferencing platform 106).

Upon receiving the request, the routing module 108*a* at the hosting site determines (206) configuration attributes of the conference session. Configuration attributes can include but are not limited to security features (e.g., PIN), organizer/participant information (e.g., who is authorized to start the session), technical attributes (e.g., what specific capabilities are desired or required for the meeting room at the media engine 110), and the like. Once the configuration attributes are determined, the routing module 108*a* connects (208) the media stream originating from the first end point device 102*a* to a waiting room at the media player/IVR module 109 as a temporary location while the platform 106 waits for establishment of the session by the meeting organizer.

The edge module 107 receives (210) a second request to join the conference session from a second end point device 102*b* associated with an organizer of the session. In some embodiments, the edge module 107 contacts the routing module 108*a* (as described above) to determine the hosting site for the session and the routing module 108*a* directs the second end point device 102*b* to the routing module 108*a* of the hosting site. In some embodiments, the routing module 108*a* of the hosting site can direct the media stream of the second end point device 102*b* to the media player/IVR module 109 while the platform 106 completes initiation and establishment of the meeting room on the media engine 110.

The NAPI module 108*a* at the hosting site determines (212) a meeting room for the conference session at the hosting site (e.g., by querying the MLS module 108*b* to get a list of available media engine(s) 110 with capacity and capability of hosting the session. The NAPI module 108*a* then establishes (214) the conference session at the selected media engine 110, notifies the MLS module 108b that the conference session is started, and notifies the media player/IVR module 109 to transfer the media streams of the first end point device 102a and of the second end point device 102b into the established meeting room.

FIGS. 3A-3B are workflow diagrams of a method of allocating resources in a media-based conference session, using the system 100 of FIG. 1. The workflow illustrated in FIGS. 3A-3B is a detailed embodiment of the method 200 set forth in FIG. 2.

As shown in FIG. 3A, the edge module 107 receives a first request to join a conference session from a first end point device 102a and transmits (302) the first request to the NAPI module 108a. The NAPI module 108a queries (304) the MLS module 108b for the particular hosting site in the conferencing platform 106 that should host the conference session. The MLS module 108b returns (306) the hosting site to the NAPI module 108a, which in turn returns (308) the hosting site to the edge module 107.

The edge module 107 then routes (310) the media stream associated with the first end point device 102a to the NAPI module 108a at the hosting site. The NAPI module 108a queries (312) the MLS module 108b at the hosting site for configuration attributes associated with the conference session. The MLS module 108b returns (314) the configuration attributes to the NAPI module 108a.

The NAPI module 108a then routes (316) the media stream for the first end point device 102a to a waiting room at the media player/IVR module 109 of the hosting site. The media player/IVR module 109 then notifies the MLS module 108b that the first end point device 102a is connected to the module 109 and waiting for the conference session to be established.

Turning to FIG. 3B, the edge module 107 receives a second request to join the conference session from a second end point device 102b and transmits (320) the second request to the NAPI module 108a. The NAPI module 108a queries (322) the MLS module 108b for the particular hosting site in the conferencing platform 106 that should host the conference session. The MLS module 108b returns (324) the hosting site to the NAPI module 108a, which in turn returns (326) the hosting site to the edge module 107.

The edge module 107 then routes (328) the media stream associated with the second end point device 102b to the NAPI module 108a at the hosting site. The NAPI module 108a queries (330) the MLS module 108b at the hosting site for the meeting room to use as the host for the conference session. The MLS module 108b returns (332) the meeting room location (e.g., which media engine will host the session) to the NAPI module 108a.

The NAPI module 108a then routes (334) the media stream for the second end point device 102a to the meeting room located on a media engine/MCU 110 at the hosting site. The NAPI module 108a then notifies (336) the MLS module 108b that the meeting room has been established, and the MLS module 108b in turn notifies (338) the media player/IVR module 109. The module 109 then routes (340) the media stream for the first end point device 102a to the meeting room on the MCU 110 that has been established for the conference session.

Managing Conference Session State

As conference session requests enter the conferencing system 106 and sessions are established between a plurality of end point devices 102a-102b, the conferencing system 106 maintains data structures that encapsulate a picture of the current session state for conference sessions taking place on the platform. This session state information is useful for a variety of different functions, such as making subsequent routing and resource allocation decisions, determining whether load balancing is required, determining conditions or errors for conference sessions on the platform 106, and the like. Another advantage provided by the system 100 is the generation of a fast, efficient, in-memory data structure to contain information used by the platform 106 to make atomic resource allocation decisions.

Figure 4:
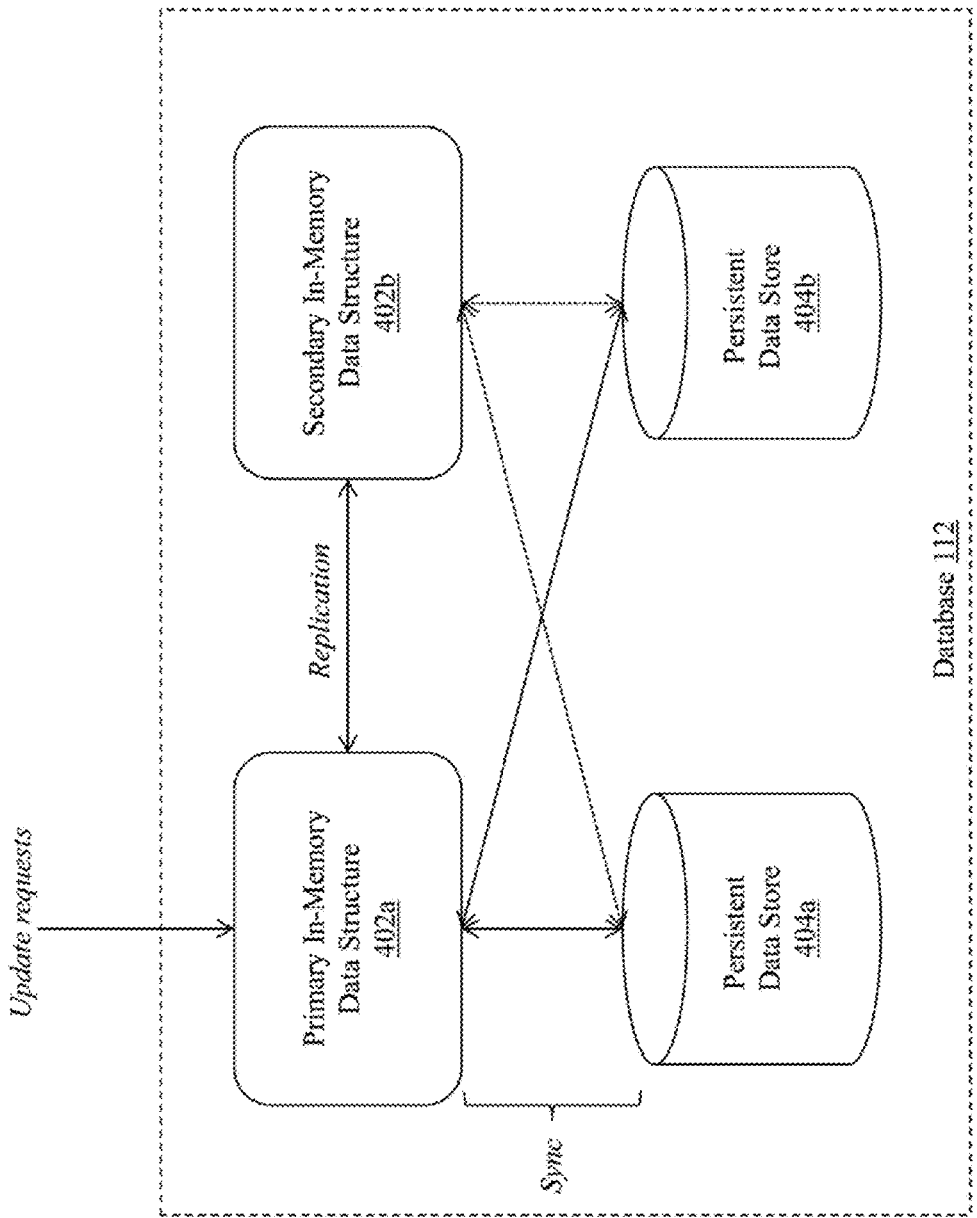
FIG. 4 is a detailed block diagram of a module for managing session state for a plurality of media-based conference sessions.

FIG. 4 is a detailed block diagram of a module for managing session state for a plurality of media-based conference sessions, using the system of FIG. 1. As shown in FIG. 4, the database 112 of FIG. 1 comprises several sub-components, including a primary in-memory data structure 402a, a secondary in-memory data structure 402b, and persistent data stores 404a-404b. It should be appreciated while FIG. 4 shows the sub-components 402a, 402b, 404a, and 404b as located on the database 112, the sub-components can be distributed among any of the components of FIG. 1 without departing from the scope of invention. For example, in some embodiments the in-memory data structures 402a-402b can be located in a memory device coupled to the NAPI module 108a or the MLS module 108b, while the persistent data stores 404a-404b can remain part of the database 112.

The primary in-memory data structure 402a and the secondary in-memory data structure 402b comprise information that represents the state of conference sessions in-process on the conferencing platform 106 at any given time. As the name suggests, the data structures 402a-402b reside entirely in memory of a computing device of the platform 106 to enable fast and efficient updates to the session state information in an atomic fashion (i.e., updating session state information sequentially according to a timestamp associated with each update request that comes in). In some embodiments, the data structures 402a-402b do not expire (unlike traditional data caches), thereby providing an always-available, up-to-date resource to determine the current session state in the platform 106.

The primary in-memory data structure 402a has several functions, including but not limited to:

Accepting read and write requests from other components of the platform 106 (such as the NAPI module 108a, the MLS module 108b, the media engine/MCU 110) as well as external components like resource managers of networks/platforms through which the end point devices 102a-102b connect to the platform 106 (e.g., Skype™ gateways);

Replicating data to the secondary in-memory data structure 402b (which may be located in different sites or geographies) and to the persistent data stores 404a-404b;

Providing an index into the current position of the data structure for use by, e.g., the persistent data stores 404a-404b, to enable the data stores to understand how out of sync their local set of data is; and Synchronizing/restoring data to persistent data stores 404a-404b as needed.

In FIG. 4, requests to update the session state information arrive at the primary in-memory data structure 402a. For example, such requests to update the session state information can include information regarding the establishment of new sessions, resources being utilized by current in-process sessions, and so forth. The primary in-memory data structure 402a can replicate the updated information to the secondary in-memory data structure 402b, and also synchronize the updated information with the persistent data stores 404a-404b.

The secondary in-memory data structure 402b essentially acts as a copy/backup for the primary in-memory data structure 402a. In the event that the primary data structure 402a fails or is unavailable, the platform 106 can leverage the secondary data structure 402b to ensure that current session state information remains available to the components of the platform 106 while the primary data structure 402a recovers. In some embodiments, the primary and secondary data structures 402a-402b can be configured such that they both manage a different set of data and each data structure 402a, 402b responds to certain requests for its neighbor data structure. For example, an update request relating to a conference that is online could be serviced by either data structure 402a, 402b and if the conference is not online, the request is processed by the primary data structure 402a (e.g., to ensure atomic processing of the new conference request).

The persistent data stores 404a-404b are used to store information that is typically more static than the dynamic session state information maintained by the primary in-memory data structure 402a. For example, information such as meeting room configuration, media engine 110 resource availability and the like does not require frequent updates (in contrast to the session state information) and therefore can be stored in persistent data stores 404a, 404b. The primary in-memory data structure 402a can access the data stores 404a-404b to retrieve certain types of information that is used as part of the session state information, and the primary data structure 402a can issue updates to the persistent data stores 404a-404b, e.g., periodically as needed. In some embodiments, one of the persistent data stores 404a can be designated as a master data store and the other 404b can be designated as a slave data store. These designations provide the advantage of establishing priority between the data stores 404a-404b and enabling redundancy in the event that the master data store fails or is unreachable.

In some embodiments, the primary in-memory data structure 404a provides a simplified set of data interaction functionality that supports create, read, update, and delete on specific session state data objects in the structure. In one embodiment, the syntax for interacting with and managing data in the data structure 404a is not table-based, but rather object-based and can represent multiple joined data tables. For example, a video conference session may have a data schema as follows:

Meeting (object), with data fields:
    ID
    Title
    Start Time
    End Time
    Participants (object)
        ID
        Meeting ID In one example, the primary in-memory data structure 404a can include an interface as follows to read the data: Meeting getMeeting(id).

As described above, the Meeting object has properties such as:

```
Meeting {
    String ID;
    String Title;
    Date StartTime;
    Date EndTime;
    Participants[ ] Participants;
}
```

As updates to any of the properties of a meeting object are received by the primary in-memory data structure 402a, the data structure 402a locks the entire meeting object until all of the data is updated across all of the underlying tables or data stores.

Also, as mentioned previously, data is replicated from the primary in-memory data structure 402a to the other data storage elements 402b, 404a, 404b for creates, updates and deletes. In one embodiment, the replication process is as follows:

1) The primary in-memory data structure 402a receives the data change request (e.g., create, update, delete);
2) The data element that pertains to the change request is locked from reading or updating by the primary in-memory data structure 402a, and subsequent change requests for the same data element are blocked for the time being (i.e., rather than rejecting them). In some embodiments, the subsequent change requests are stored in a temporary queue and allocated a timestamp when received for sorting and later processing priority;
3) The changed data element is replicated to the secondary in-memory data structure 402b;
4) Upon successful replication, the data element is updated in the primary in-memory data structure 402a, the lock on the data element is released, and subsequent change requests for the data element (e.g., stored in the temporary queue) are serviced by the primary in-memory data structure 402a.

Then, the primary in-memory data structure 402a sequentially replicates the changed data element(s) to the persistent data stores 404a, 404b. In some embodiments, if there is an error in replicating to one or more the persistent data stores 404a, 404b, the data store(s) experiencing difficulty are marked off-line and asked to re-sync with the primary in-memory data structure 402a when they become available again.

In addition, in order to maintain the primary in-memory data structure 402a across multiple sites in the conferencing platform 106, the primary in-memory data structures 402a (and, in some embodiments, the secondary in-memory data structures 402b) at each site maintains an index of the objects they are managing. Using the meeting object example above:

Relational Data Description
Meeting
ID
Title
Start Time
End Time
Participants
ID
Meeting ID
Managed Object

```
Meeting {
    String ID;
    String Title;
    Date StartTime;
    Date EndTime;
    Participants[ ] Participants;
}
```

Managed Object Including Index

```
Meeting {
    String ID;
    String Title;
    Date StartTime;
    Date EndTime;
    Participants[ ] Participants;
    String lastUpdateUTC;
}
```

When a primary in-memory data structure 402a at another site comes on-line, the data structure 402a queries another primary data structure at another site (e.g., a parent structure) to assess if the it is in sync with the other site's structure at by using, e.g., a function such as: String[ ] [ ] getHashIndex( ).

The result is an object array of values that represent the latest time that the related data element was updated. The data structure with the most 'recent' set of data (i.e., based on a comparison of the index) is deemed to be the master. The master structure's data is then synchronized to other in-memory data structures and, in some cases, to the persistent data stores 404a-404b at each site.

If there is a conflict in the data element(s) during replication, the conferencing platform 106 is configurable to support either: 1) overwrite with latest (based on UTC time), or 2) delete both and, e.g., the call failed/is corrupted.

Figure 5:
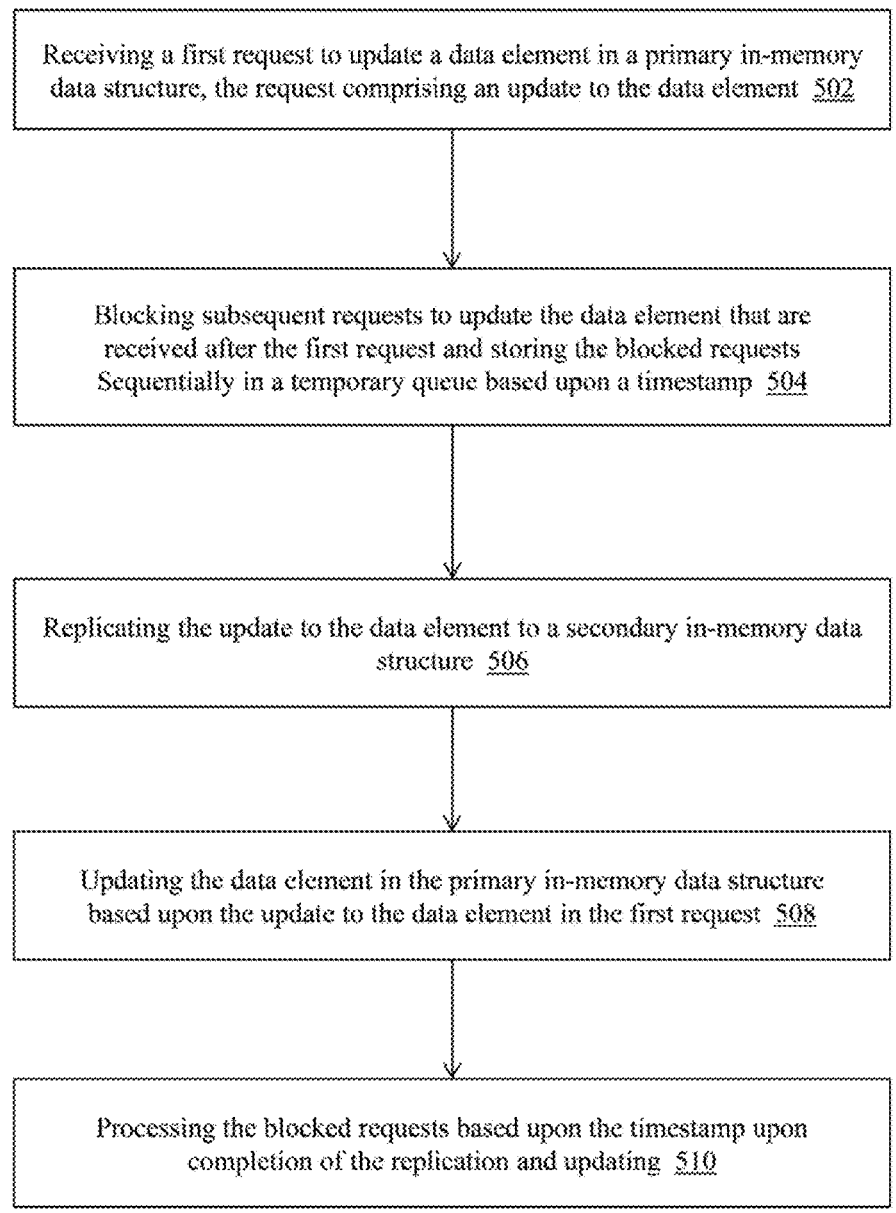
FIG. 5 is a flow diagram of a method of managing session state for a plurality of media-based conference sessions.

FIG. 5 is a flow diagram of a method of managing session state for a plurality of media-based conference sessions, using the system of FIGS. 1 and 4. The primary in-memory data structure 402a receives (502) a first request to update a data element. The primary data structure 402a blocks (504) subsequent requests to update the data element that are received after the first request and stores the blocked requests sequentially in a temporary queue based upon a timestamp assigned to each request.

The primary data structure 402a replicates (506) the update to the data element in the first request to the secondary in-memory data structure 402b, and updates (508) the data element in the primary data structure 402a based upon the update to the data element in the first request. The primary data structure 402a processes (510) the blocked requests based upon the timestamp upon completion of the replication and updating steps.

Live Session Re-routing

Another aspect of the methods and systems described herein is to provide an optimal experience for multi-party audio and video conferencing. To provide a high level of resilience and quality in the context of resource-intensive processes such as video conferences, the ability to move sessions dynamically between media engines—without dropping the session or relying on the participant end point devices to be aware or have any special requirements—is important. Typically, three conditions can arise that trigger a session to be moved: 1) hardware/software/network failure; 2) load thresholds; and 3) meeting size (i.e., number of participants). When any of these conditions occurs, the method for handling the session is the same. The one difference between these conditions is that the edge module 107 should be resilient to on-platform lost media in the event of failure, with a configurable time to wait for instructions from the other components of the platform on how to handle the failure. If no instructions are received, the edge module 107 can process a tear down of the session normally, as an unrecoverable situation has been encountered. However, upon detection of lost media, the edge module 107 can have, e.g., an internal play mechanism to keep media flowing on the external side of the session (i.e., the connection between the end point device and the edge module) while a new media engine to host the session is identified and provided.

Figure 6:
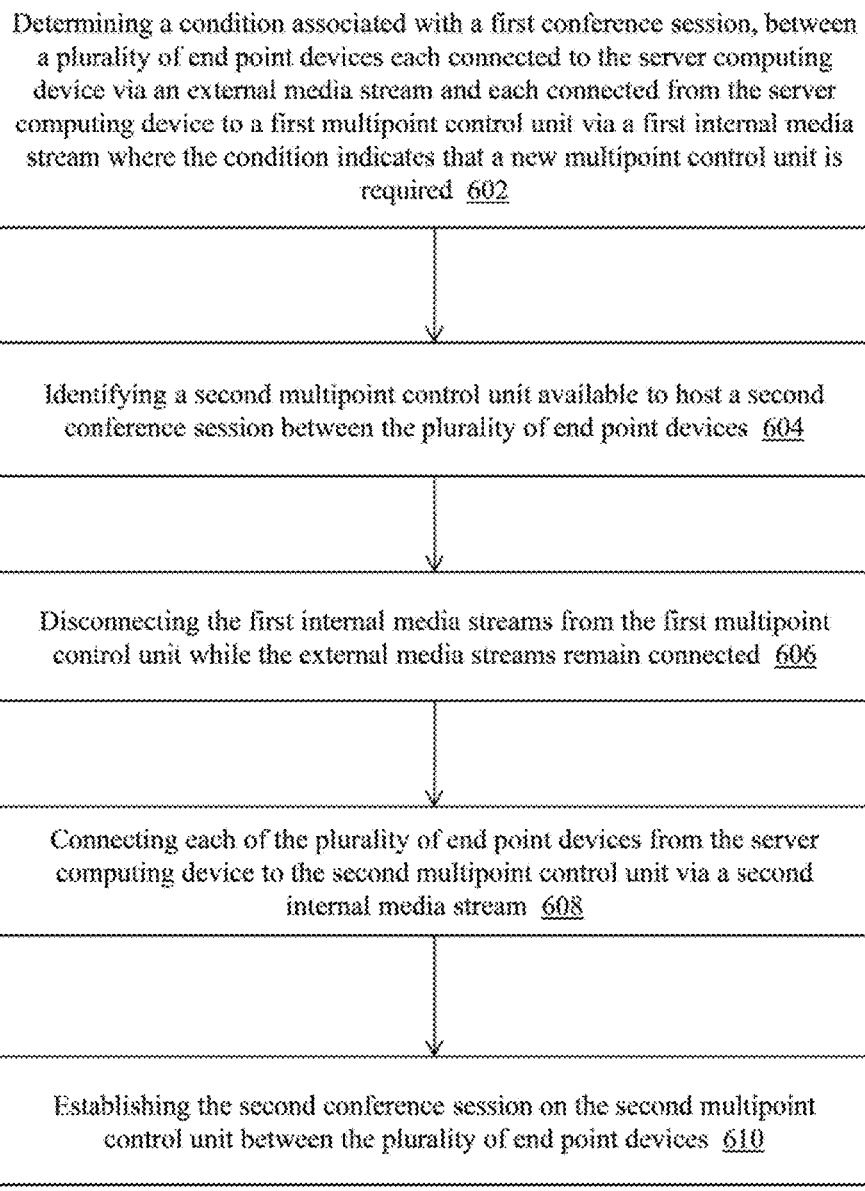
FIG. 6 is a flow diagram of a method of rerouting a media-based conference session.

FIG. 6 is a flow diagram of a method 600 of rerouting a media-based conference session, using the system 100 of FIG. 1. The network monitoring module 111 determines (602) a condition associated with a first conference session between a plurality of end point devices 102a-102b each connected to the conferencing platform 106 via an external media stream (e.g., between the device and the edge module 107) and each connected from the edge module 107 to the media engine (MCU) 110 hosting the session via an internal media stream. As mentioned above, the condition can be a network failure, a load threshold, and/or a meeting size threshold that requires a new media engine (MCU) 110 be allocated to host the session.

The NAPI module 108a identifies (604) a second media engine (MCU) 110 available to host a second conference session between the plurality of end point devices 102a-102b. The NAPI module 108a notifies the edge module of the location of the second media engine 110.

The edge module 107 disconnects (606) the internal media streams for the end point devices 102a-102b between the edge module 107 and the first media engine 110 while the external media streams remain connected, and connects (608) each of the end point devices 102a-102b from the edge module 107 to the second media engine 110 via a second internal media stream. The second media engine (MCU) 110 establishes (610) the second conference session between the end point devices 102a-102b. The end point devices 102 do not lose connectivity with the conferencing platform 106 during transfer of the session between media engines and thus the session is maintained without involvement of the end point devices or associated users—resulting in a better experience for users of the platform 106.

Figure 7:
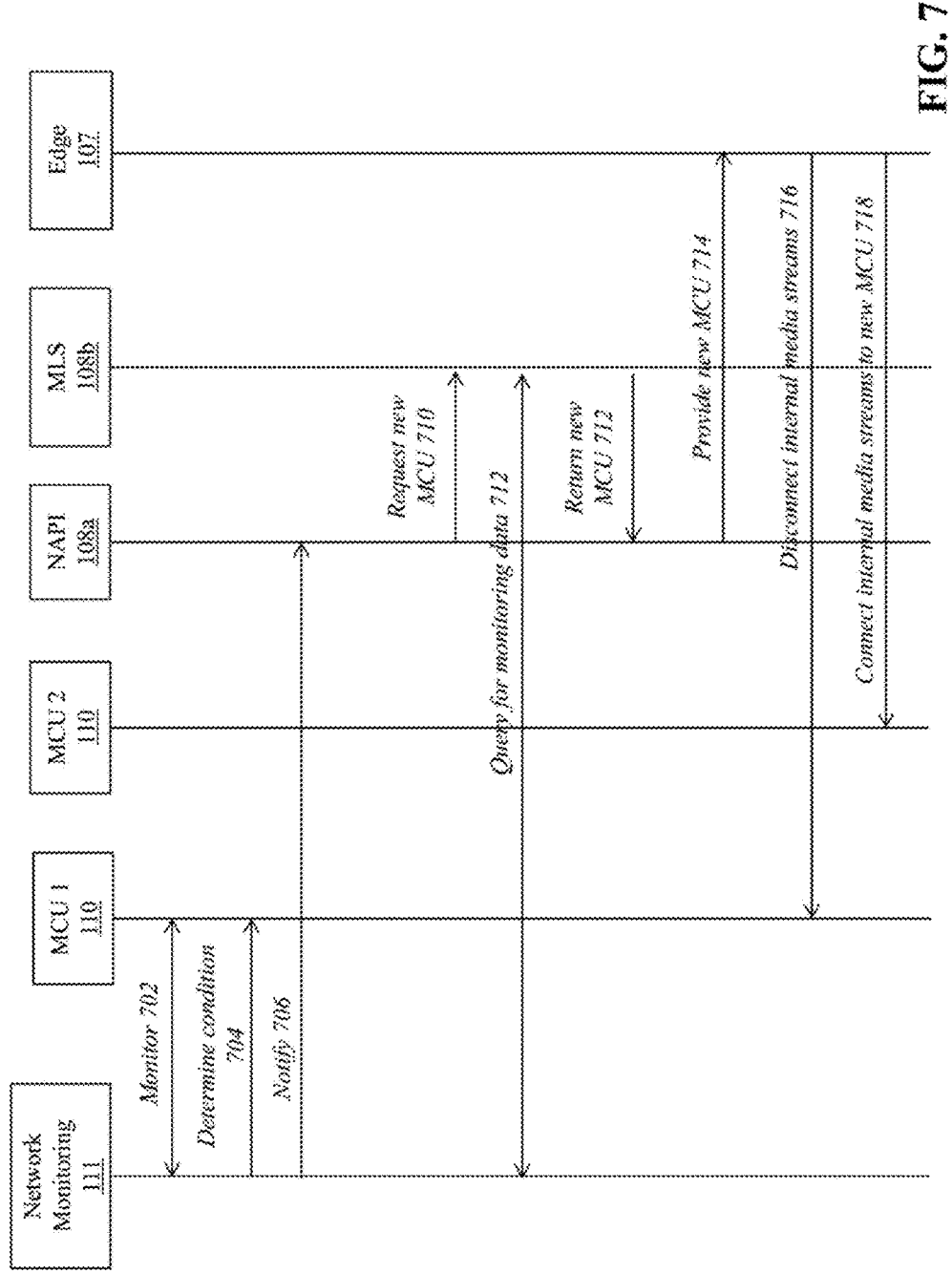
FIG. 7 is a workflow diagram of a method of rerouting a media-based conference session.

FIG. 7 is a workflow diagram of a method of rerouting a media-based conference session, using the system 100 of FIG. 1. The workflow illustrated in FIG. 7 is a detailed embodiment of the method 600 set forth in FIG. 6. The network monitoring module 111 monitors (702) the MCU 110 currently hosting the conference session between the plurality of end point devices 102a-102b. During the monitoring, the module 111 determines (704) a condition of the conference session and/or MCU that requires a new MCU is allocated to host the conference session.

The network monitoring module 111 notifies (706) the NAPI module 108a that the condition exists and a new MCU is required. The NAPI module 108a requests (708) a new MCU by querying the MLS module 108b. In some embodiments, the MLS module 108b also queries the network monitoring module 111 to receive additional information about the current state and resource allocation on the platform 106 in order to select a new MCU. The MLS module 108b returns (710) the selected new MCU to the NAPI module 108a.

The NAPI module 108a provides (712) the new MCU to the edge module 107. The edge module 107 disconnects (714) the internal media streams for each of the end point devices 102a-102b between the edge module 107 and the first MCU that originally hosted the session. The edge module 107 then connects (718) new media streams for each of the end point devices 102a-102b between the edge module 107 and the new MCU 110, which establishes a new conference session for continuation of the original session.

Media Negotiation and Transcoding

Another important aspect of the methods and systems described herein is the ability to perform media negotiation and transcoding according to individual end point device capabilities and/or user preferences instead of using a lowest common denominator approach that is not tailored for specific users. The media negotiation and transcoding techniques described herein allow for the conferencing platform 106 to resolve issues with media negotiation before media streams for a conference session are set up and, if necessary, to engage transcoding processes as needed for resolution of compatibility issues to ensure session success. Using data collected from the signaling including the end point device type, session description information, source network, and the like, the conferencing platform 106 can proactively resolve media compatibility issues.

One aspect of the media negotiation and transcoding techniques described herein is the collection and maintenance of profile information associated with end point devices and/or networks (e.g., Skype™) from which the end point devices reach the conferencing platform 106. The profile information can be collected in advance of conference session establishment and/or dynamically over time as end point devices contact and use the platform 106.

In one example, the profile information can include:
The network the end point device is using to connect to the platform—this allows for specific processing based on the source of the end point device;
Signaling data—elements include the User-Agent (i.e., reported client type) and the session description (e.g., resolution, codec, and so forth). In addition to these, other headers can be used like, e.g., Supported and Require from Session Initiation Protocol (SIP); and
Client quality metrics (typical resolution, jitter, latency, and the like).

Figure 8:
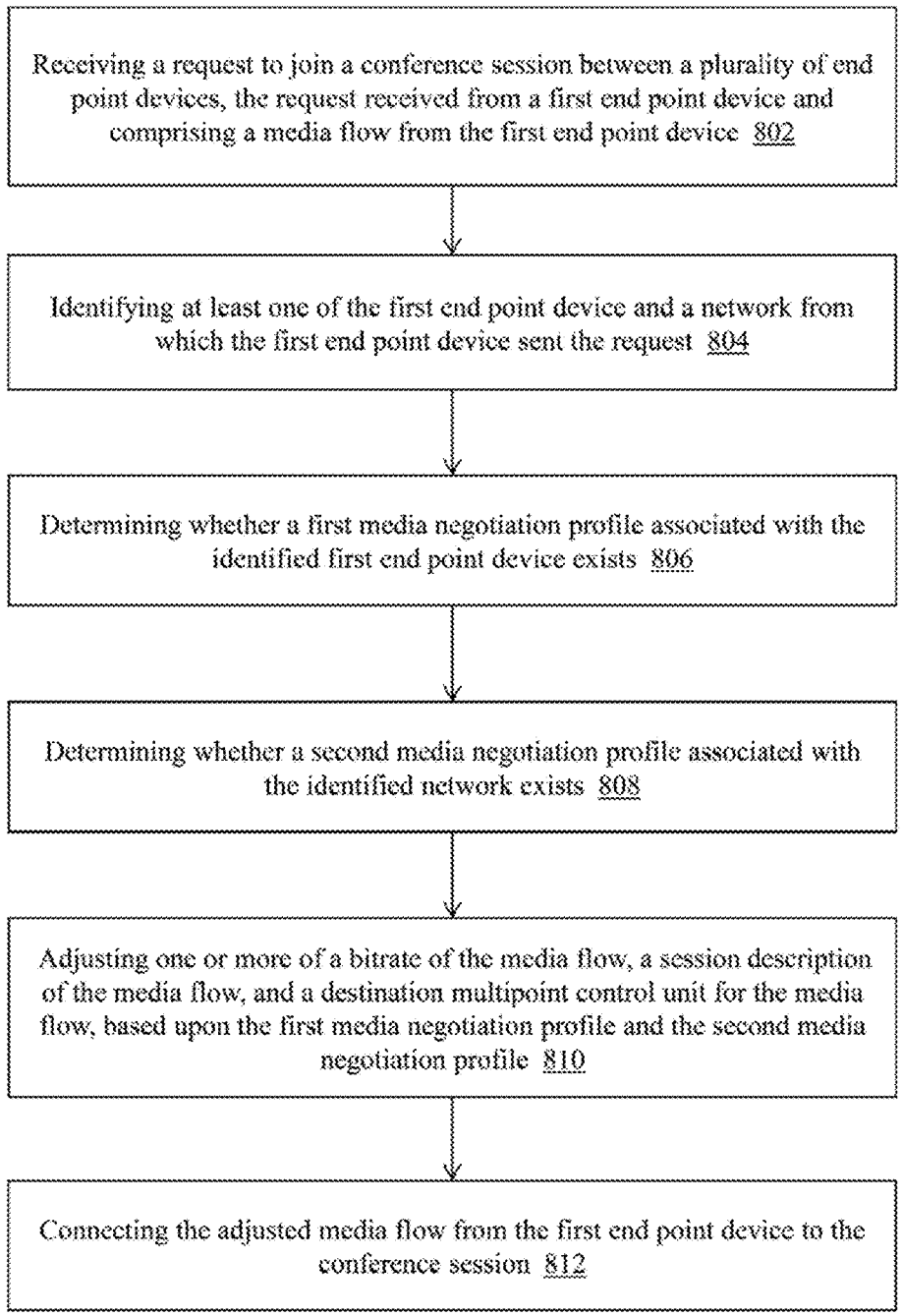
FIG. 8 is a flow diagram of a method of negotiating media capabilities between a plurality of end point devices in a media-based conference session.

FIG. 8 is a flow diagram of a method 800 of negotiating media capabilities between a plurality of end point devices in a media-based conference session, using the system 100 of FIG. 1. The edge module 107 receives (802) a request to join a conference session between a plurality of end point devices 102a-102b. The request is received from a first end point device 102a and the request comprises a media flow from the first end point device 102a. The edge module 107 identifies (804) at least one of the first end point device 102a and a network from which the first end point device 102a sent the request. For example, the edge module 107 can retrieve information about the end point device and/or network from, e.g., database 112 based upon signaling data, technical attributes of the end point device/network, and the like.

The edge module 107 determines (806) whether a first media negotiation profile associated with the identified first end point device 102a exists. For example, based upon the identification of the end point device, the edge module 107 can query the database 112 to retrieve a media negotiation profile for the end point device.

The media negotiation profile can include certain media types, codecs, and the like that are supported by the end point device 102a based upon its technical capabilities and/or user requirements. For example, an end point device 102a that is limited to supporting only a small subset of codecs can have a media negotiation profile that reflects those codecs. In another example, the end point device 102a may be associated with an entity (e.g., a corporation) that wants to limit the bandwidth consumed by its employees during conference sessions. The media negotiation profile for end point devices associated with the entity can identify limitations on the amount of data and the quality (e.g., resolution) of conference sessions that can be received by the end point devices.

The edge module 107 also determines (808) whether a second media negotiation profile associated with the identified network exists. The edge module 107 uses similar considerations as above with respect to the media negotiation profile for the identified network. For example, a conference session request coming from an end point device in a known network that the platform 106 understands to have capacity or quality limitation can have a media negotiation profile reflecting those limitations. In another example, a conference session request coming from a network that has a specific requirement (e.g., WebRTC/VP8) can have that requirement reflected in the media negotiation profile for the network.

The edge module 107 adjusts (810) one or more of a bitrate of the media flow, a session description of the media flow, and a destination MCU 110 for the media flow, based upon the first media negotiation profile and the second media negotiation profile. For example, a conference session request from an end point device 102a can advertise in its signaling a capability that is known to not be valid (e.g., E20 does not indicate its profile-level-id correctly—offers 1.2 but supports 3.1), or the end point device indicates support for a codec that has known issues (e.g., processing Lifesize with G.722.1C). The edge module 107 can adjust the session description using that information before transmitting the media flow for the end point device 102a to the MCU 110. In another example, the edge module 107 can remove unsupported codecs or features from the session description.

In another example, the edge module 107 can engage a transcoding engine (including any necessary signaling modifications) based upon the first media negotiation profile and the second media negotiation profile. For example, a conference session request that offers a particular codec is destined for an MCU location that does not support the codec. The edge module 107 can modify the signaling to provide a supported codec, and the connection information can include a transcoding engine in the path between the end point device and the MCU 110 to convert the media (i.e., inline transcoding).

In another example, the edge module 107 can perform route modification based upon the first media negotiation profile and the second media negotiation profile. For example, as mentioned above, the edge module 107 can route a conference session request from an end point device having a specific requirement (WebRTC/VP8) to a media engine/MCU 110 that supports the required functionality, or has the functionality built in, to avoid having to inline transcode the media flow between the end point device and the MCU.

Figure 9:
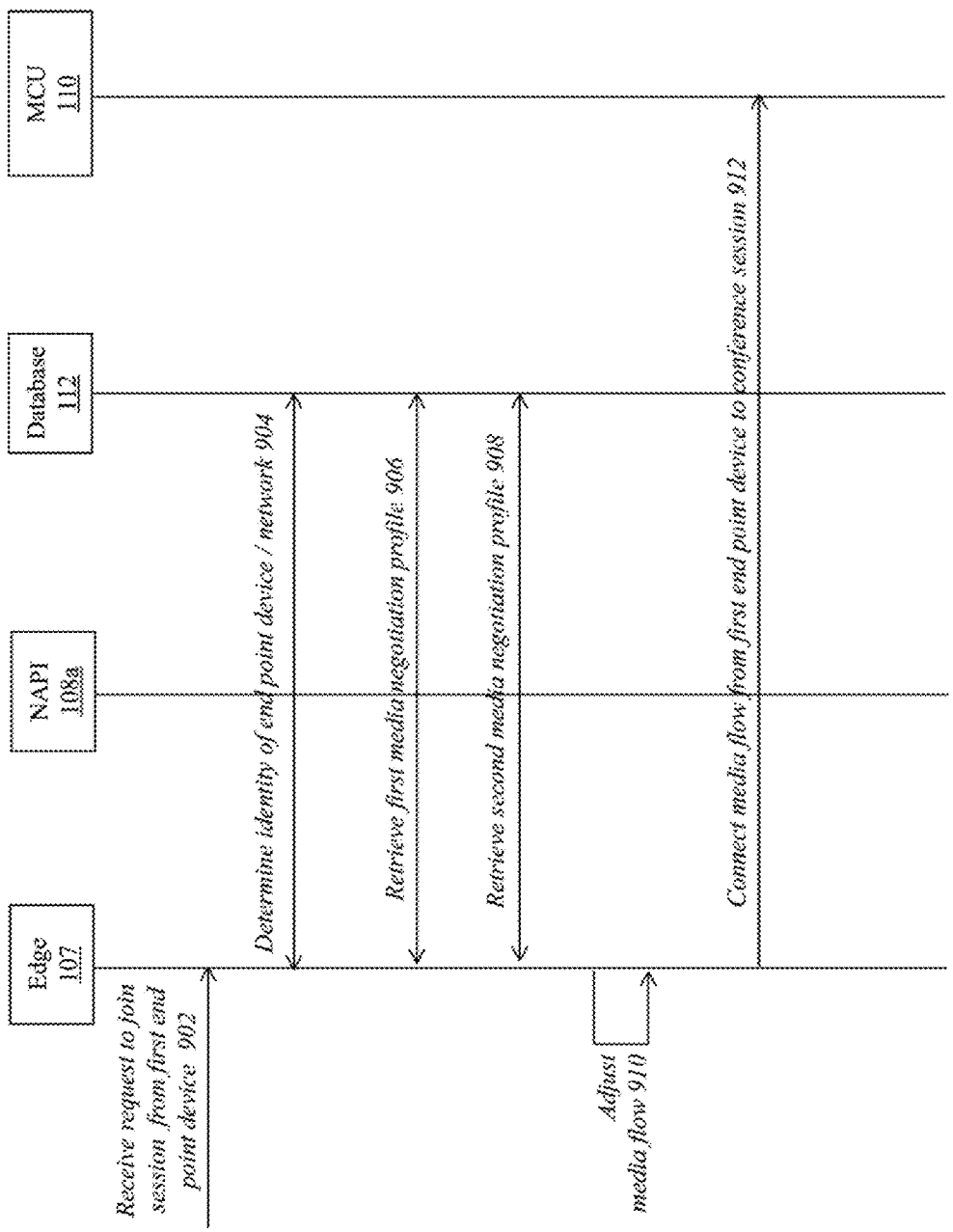
FIG. 9 is a workflow diagram of a method of negotiating media capabilities between a plurality of end point devices in a media-based conference session.

FIG. 9 is a workflow diagram of a method of negotiating media capabilities between a plurality of end point devices in a media-based conference session, using the system 100 of FIG. 1. The workflow illustrated in FIG. 9 is a detailed embodiment of the method 800 set forth in FIG. 8.

The edge module 107 receives (902) a first request to join a conference session from a first end point device 102a. The edge module 107 communicates with the database 112 to determine (904) the identity of the end point device 102a and/or the network from which the end point device 102a sent the request.

Based upon the determined identities, the edge module 107 communicates with the database 112 to retrieve (906) the first media negotiation profile associated with the end point device 102a. The edge module 107 also communicates with the database 112 to retrieve (908) the second media negotiation profile associated with the network from which the end point device 102a sent the request.

The edge module 107 adjusts (910) the media flow associated with the first end point device 102a based upon the retrieved media negotiation profiles. In some cases, either one or both media negotiation profiles do not exist. The edge module 107 can create a new media negotiation profile for the end point device 102a and/or network based on the information the module 107 knows about the device/network. In another example, the edge module 107 can simply transfer the media flow to the appropriate MCU 110 without performing any processing or modification of the flow. After adjusting the flow, the edge module 107 connects (912) the media flow from the first end point device to the conference session on the applicable media engine/MCU 110.

It should be understood that any of the above-described methods, systems, and techniques can be implemented in the context of video conferencing (i.e., conference calls consisting of video and audio media) and audio-only conferencing without departing from the scope of invention.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOW), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UNITS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method of monitoring conference session resources in a media-based conferencing system, the method comprising:
    establishing, by a server computing device, a connection to one or more media engines hosting one or more in-process conference sessions;
    periodically capturing, by the server computing device, system level information, application level information, and meeting size associated with each of the in-process conference sessions from the media engines, wherein capture of the application level information includes:
        identifying a media flow for each end point device participating in one of the in-process conference sessions and a network from which the end point device is connected to the corresponding media engine using technical attributes of the end point device and of the network that are extracted from signaling data carried on the media flow between the end point device and the media engine;
        determining whether a first media negotiation profile associated with each identified end point device exists, the first media negotiation profile defining technical capabilities of the corresponding end point device and user media quality prferences of the corresponding end point device;
        determining whether a second media negotiation profile associated with the identified network exists, the second media negotiation profile defining technical capabilities of the identified network including bandwidth capacity and media flow quality limitations; and
        capturing a bitrate of each media flow, a session description of each media flow, information from the first media negotiation profile, and information from the second media negotiation profile for inclusion in the application level information;
    determining, by the server computing device, a session state associated with each of the in-process conference sessions based upon the captured information;
    determining, by the server computing device, a pool of available computing devices to provide resources to the in-process conference sessions;
    allocating, by the server computing device, one or more of the available computing devices to the in-process conference sessions based upon the session state;
    periodically reporting, by the server computing device, the session state associated with each of the in-process conference sessions and the pool of available computing devices to a network API module; and
    determining, by the network API module, a routing for subsequent communication session requests based upon the reported session state and pool of available computing resources.

2. The method of claim 1, wherein the system level information comprises processor utilization, memory utilization, and network utilization for each of the media engines hosting the conference sessions.

3. The method of claim 1, wherein the application level information comprises a count of active conference sessions.

4. The method of claim 3, wherein the application level information further comprises a resolution for the media flow between the end point device and the media engine.

5. The method of claim 1, wherein the meeting size comprises a count of participants for each conference session.

6. A system for monitoring conference session resources in a media-based conferencing system, the system comprising a server computing device having a processor and a memory, the processor configured with executable instructions operable to cause the server computing device to:
    establish a connection to one or more media engines hosting one or more in-process conference sessions;
    periodically capture system level information, application level information, and meeting size associated with each of the in-process conference sessions from the media engines, wherein capture of the application level information includes:
        identifying a media flow for each end point device participating in one of the in-process conference sessions and a network from which the end point device is connected to the corresponding media engine using technical attributes of the end point device and of the network that are extracted from signaling data carried on the media flow between the end point device and the media engine;
        determining whether a first media negotiation profile associated with each identified end point device exists, the first media negotiation profile defining technical capabilities of the corresponding end point device and user media quality preferences of the corresponding end point device;
        determining whether a second media negotiation profile associated with the identified network exists, the second media negotiation profile defining technical capabilities of the identified network including bandwidth capacity and media flow quality limitations; and
        capturing a bitrate of each media flow, a session description of each media flow, information from the first media negotiation profile, and information from the second media negotiation profile for inclusion in the application level information;
    determine a session state associated with each of the in-process conference sessions based upon the captured information;
    determine a pool of available computing devices to provide resources to the in-process conference sessions;
    allocate one or more of the available computing devices to the in-process conference sessions based upon the session state;
    periodically report the session state associated with each of the in-process conference sessions and the pool of available computing devices to a network API module, wherein the network API module determines a routing for subsequent communication session requests based upon the reported session state and pool of available computing resources.

7. The system of claim 6 wherein the system level information comprises processor utilization, memory utilization, and network utilization for each of the media engines hosting the conference sessions.

8. The system of claim 6, wherein the application level information comprises a count of active conference sessions.

9. The system of claim 8, wherein the application level information further comprises a resolution for the media flow between the end point device and the media engine.

10. The system of claim 6, wherein the meeting size comprises a count of participants for each conference session.

11. A computer program product, tangibly embodied in a non-transitory computer readable storage device, for monitoring conference session resources in a media-based conferencing system, the computer program product including instructions operable to cause a server computing device to:

establish a connection to one or more media engines hosting one or more in-process conference sessions;

periodically capture system level information, application level information, and meeting size associated with each of the in-process conference sessions from the media engines, wherein capture of the application level information includes:

identifying a media flow for each end point device participating in one of the in-process conference sessions and a network from which the end point device is connected to the corresponding media engine using technical attributes of the end point device and of the network that are extracted from signaling data carried on the media flow between the end point device and the media engine;

determining whether a first media negotiation profile associated with each identified end point device exists, the first media negotiation profile defining technical capabilities of the corresponding end point device and user media quality preferences of the corresponding end point device;

determining whether a second media negotiation profile associated with the identified network exists, the second media negotiation profile defining technical capabilities of the identified network including bandwidth capacity and media flow quality limitations; and capturing a bitrate of each media flow, a session description of each media flow, information from the first media negotiation profile, and information from the second media negotiation profile for inclusion in the application level information;

determine a session state associated with each of the in-process conference sessions based upon the captured information;

determine a pool of available computing devices to provide resources to the in-process conference sessions;

allocate one or more of the available computing devices to the in-process conference sessions based upon the session state;

periodically report the session state associated with each of the in-process conference sessions and the pool of available computing devices to a network API module, wherein the network API module determines a routing for subsequent communication session requests based upon the reported session state and pool of available computing resources.

\* \* \* \* \*